(12) United States Patent
Nettesheim

(10) Patent No.: US 6,387,209 B1
(45) Date of Patent: May 14, 2002

(54) FILM SEALING APPARATUS HAVING AN OPTICAL ENERGY SOURCE

(75) Inventor: Stefan Nettesheim, Zürich (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/494,557

(22) Filed: Jan. 31, 2000

(30) Foreign Application Priority Data

Jan. 29, 1999 (CH) .............................................. 0161/99

(51) Int. Cl.[7] .............................................. B32B 31/26
(52) U.S. Cl. ............................... 156/379.6; 156/379.8; 156/380.9; 156/499; 53/373.8; 53/374.5; 53/375.4; 392/424; 392/421
(58) Field of Search ........................... 156/272.2, 275.1, 156/379.6, 379.8, 380.1, 380.4, 499, 272.8; 53/451, 551, 373.8, 374.5, 375.4; 392/421, 423, 424

(56) References Cited

U.S. PATENT DOCUMENTS

| | | | | |
|---|---|---|---|---|
| 3,384,526 A | * | 5/1968 | Abramson et al. ........ | 156/380.6 |
| 3,560,291 A | * | 2/1971 | Foglia et al. ............. | 156/272.8 |
| 4,214,935 A | * | 7/1980 | Nagai ...................... | 156/272.2 |
| 4,641,315 A | | 2/1987 | Draggoo | |
| 5,113,479 A | * | 5/1992 | Anderson et al. ........ | 156/380.9 |
| 5,622,032 A | * | 4/1997 | Ryan ........................ | 53/551 |

FOREIGN PATENT DOCUMENTS

WO 96/17720 6/1996

* cited by examiner

*Primary Examiner*—Michael W. Ball
*Assistant Examiner*—John T. Haran
(74) *Attorney, Agent, or Firm*—Venable; Gabor J. Kelemen

(57) ABSTRACT

An apparatus for sealing films together along a path includes a sealing shoe and a counter shoe defining a clearance through which the films pass. The sealing shoe includes an elongated optical energy source having a length dimension oriented generally parallel to the sealing path; a reflector for focussing light emitted by the energy source; a window transparent to the light and having an outer surface adapted to be oriented toward the counter shoe for sealing the films by the light; and a firing arrangement for activating the energy source. The window and the counter shoe are urged toward one another.

11 Claims, 3 Drawing Sheets

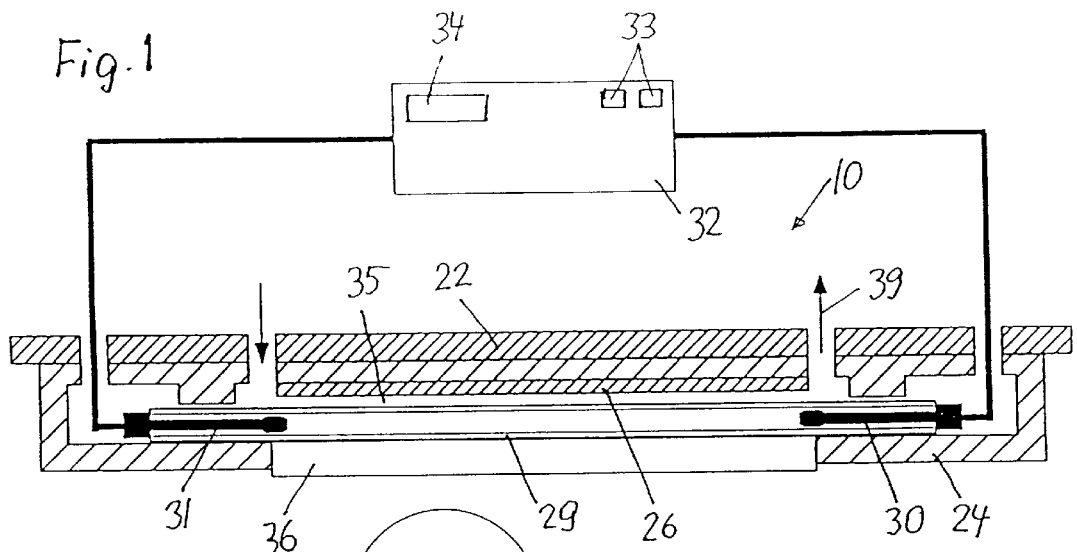
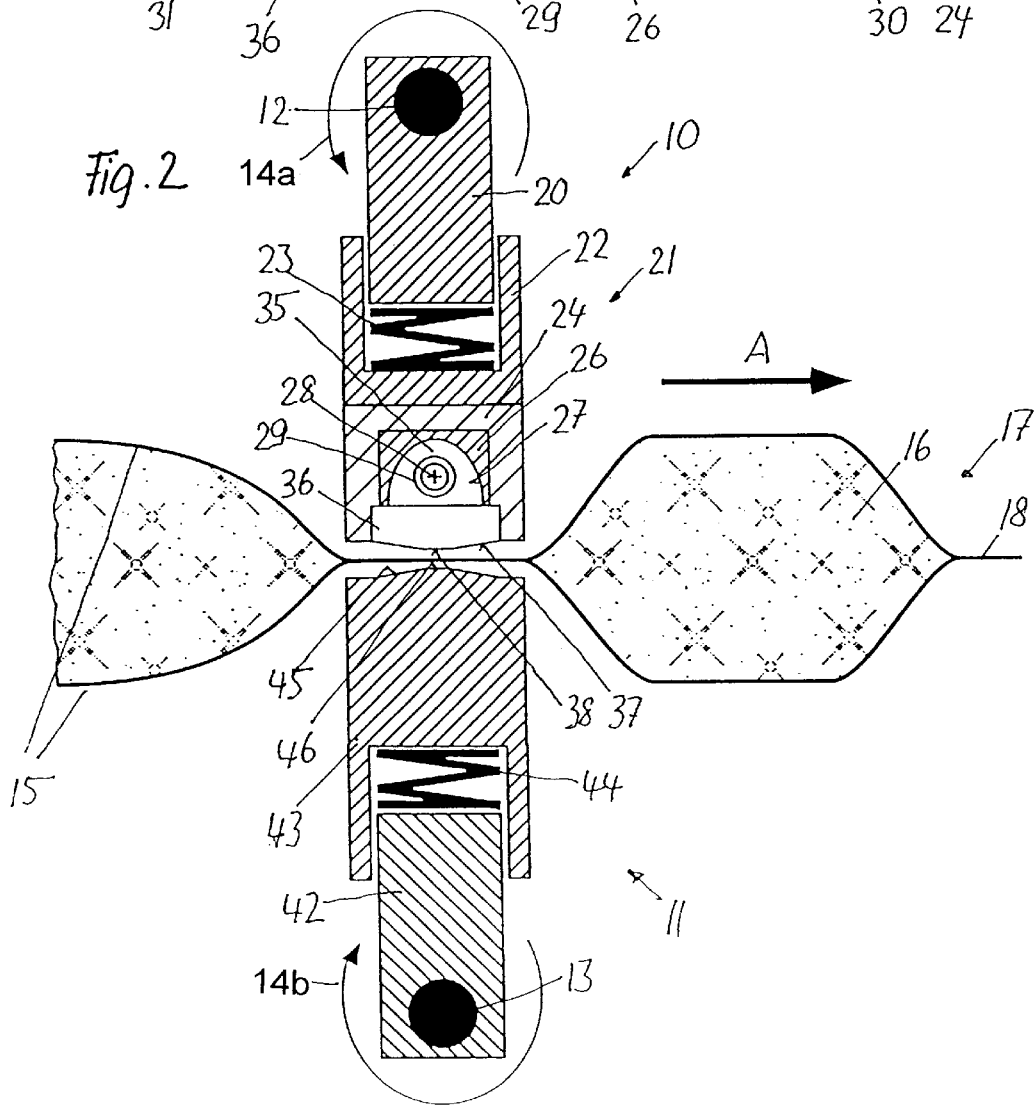

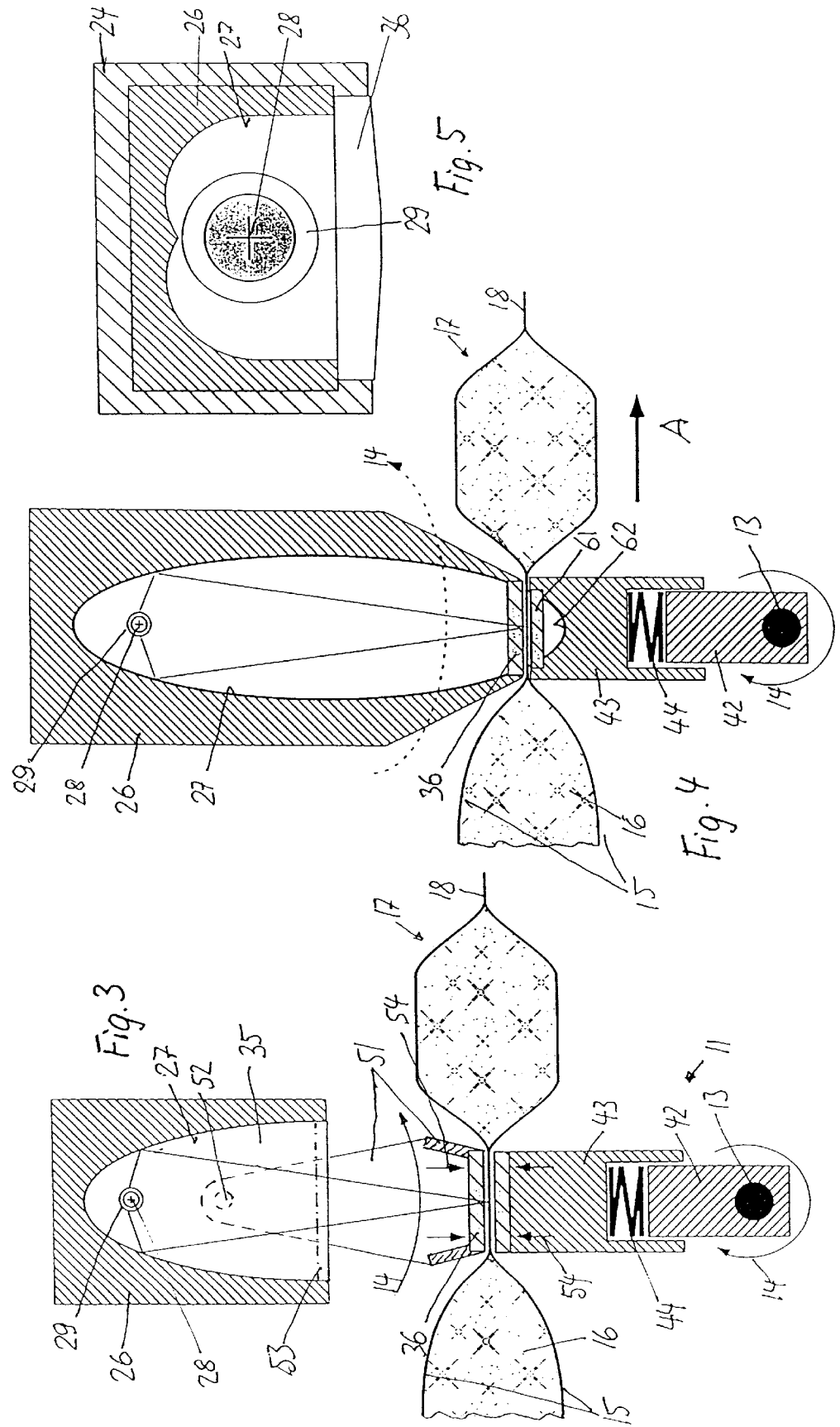

FILM SEALING APPARATUS HAVING AN OPTICAL ENERGY SOURCE

CROSS REFERENCE TO RELATED APPLICATION

This application claims the priority of Swiss Application No. 1999 0161/99 filed Jan. 29, 1999, which is incorporated herein by reference.

BACKGROUND OF THE INVENTION

Packing machines using plastic film wrappers frequently include sealing shoes with cooperating counter shoes for providing sealed seams on superposed plastic films (sheets) forming a packing hose. The sealing shoe or both the sealing shoe and the counter shoe are heated to a temperature above the melting temperature of the thermoplastic packing sheet, and the shoes are pressed to one another to seal the superposed plastic films positioned between the two shoes.

The output capacity of the above-outlined systems is necessarily limited. The heat is conducted through the film into the sealing zone. If the sealing temperature is too low, insufficient heat is transferred to the sealing layer. If, on the contrary, the sealing tools are too hot, the film tends to adhere to the contact faces of the tools. Dependent on the film thickness and the operating cycle, the parameter range in which a reliable operation is ensured might be extremely narrow. In case of rotary transverse sealing shoes, the sealing period depends from the feeding speed of the film. At high feeding speeds the sealing period is too short to produce a stable sealed seam. Such a boundary speed may be increased by providing that the transverse sealing shoe co-travels along a linear trajectory with the traveling film as described, for example, in International Application WO 96/17720. For this purpose, however, a complex mechanical system is required which often leads to vibrations, wear and operational disturbances.

In general, the sealed seam of a thermoplastic material may be exposed to stresses only after the temperature has dropped below the melting temperature. Since, because of the contact with the hot sealing tool, the entire seam volume is heated, in addition to the speed of the energy supply, the cooling phase also limits the minimum required period to ensure that the sealed seam may be exposed to stresses.

SUMMARY OF THE INVENTION

It is an object of the invention to provide an improved apparatus of the above-outlined type with which a rapid sealing may be performed and which is of simple construction.

This object and others to become apparent as the specification progresses, are accomplished by the invention, according to which, briefly stated, the apparatus for sealing films together along a path includes a sealing shoe and a counter shoe defining a clearance through which the films pass. The sealing shoe includes an elongated optical energy source having a length dimension oriented generally parallel to the sealing path; a reflector for focussing light emitted by the energy source; a window transparent to the light and having an outer surface adapted to be oriented toward the counter shoe for sealing the films by the light; and a firing arrangement for activating the energy source. The window and the counter shoe are urged toward one another.

BRIEF DESCRIPTION OF THE DRAWINGS

FIG. 1 is a sectional end elevational view of a preferred embodiment of the invention.

FIG. 2 is a sectional side elevational view of the construction shown in FIG. 1.

FIGS. 3 and 4 are sectional side elevational views of two further preferred embodiments of the invention.

FIG. 5 is a fragmentary enlarged sectional elevational view of a variant of FIG. 4.

FIGS. 6a through 11a are cross-sectional views of superposed plastic films of various properties depicted during irradiation with optical energy for sealing the films to one another.

FIGS. 6b through 11b are cross-sectional views of the superposed plastic films shown in the respective FIGS. 6a through 11a, depicted in a sealed state after irradiation with optical energy.

DESCRIPTION OF THE PREFERRED EMBODIMENTS

Figures 6A, 6B:
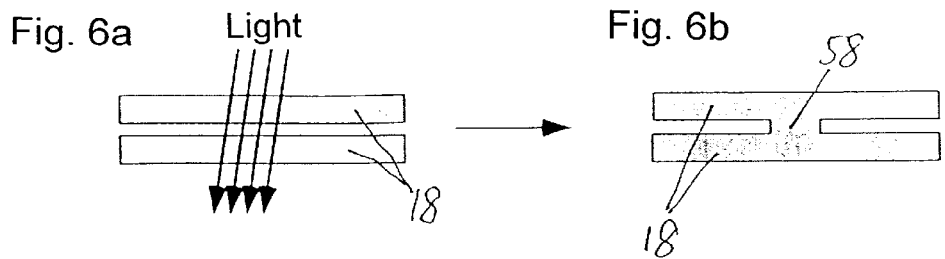

The apparatus shown in FIGS. 1 and 2 includes a sealing shoe 10 and a counter shoe 11 which are rotatable in synchronism in opposite directions about two respective, parallel spaced axes 12, 13 in the direction of respective arrows 14a and 14b. The packing hose 15 which is advanced in the conveying direction A between the sealing shoe 10 and the counter shoe 11 contains uniformly spaced products 16 to be packaged. The hose 15 is composed of a thermoplastic film 18 and has a longitudinal sealed seam (not shown). By means of transverse severing through the middle of the transverse sealed seams, individual packages 17 are obtained.

The sealing shoe 10 includes a cross-sectionally rectangular rotor 20 rotatable about the axis 12 and an optical unit 21 which includes a carrier 22 radially displaceable on the rotor 20 and biased by a spring 23 radially outwardly against a non-illustrated stop. A prismatic housing 24 made of an insulating material such as a plastic is secured to the carrier 22. Further, in the housing 24 an aluminum reflector 26 is mounted, having a cylindrical reflecting surface 27 which is cross-sectionally elliptical. A cylindrical gas discharge flash lamp such as a xenon lamp is arranged coaxially with the focal axis 28 of the surface 27, extending parallel to the rotary axis 12. The two electrodes 30, 31 of the lamp 29 are connected to a high-voltage pulse generator 32 which has a condenser switching circuit, setting elements 33 for setting parameters such as voltage, current intensity, duration of pulse and pulse shape as well as indicator elements 44 for displaying the set parameters. The space 35 between the lamp 29 and the reflector 26 is closed by a transparent window 36 which is preferably of a scratch proof material, such as sapphire glass. The approximately cylindrically curved outer surface 37 of the window 36 has a central flattened portion 38 which is oriented perpendicularly to the plane containing the axes 12, 28. The space 35 is connected to a coolant circuit 39; the coolant may be air or a transparent, electrically insulating liquid such as de-ionized water.

The counter shoe 11 has a rotor 42 having a rectangular cross section. A holder body 43 is radially displaceably mounted on the rotor 42 and is biased radially outwardly by a spring 44 against a stop. The arcuate (convex) counter face 45 of the holder body 43 has a central flattened portion 46.

In the description which follows, the operation of the above-described apparatus will be set forth.

The sealing shoe 10 and the counter shoe 11 run in synchronism in opposite directions. The circumferential speed of the two surfaces 37 and 45 is approximately the same as the advancing speed of the tubular hose 15 at least when the surfaces 37 and 45 press together the two film layers of the hose 15 running between the sealing shoe 10 and the counter shoe 11. The rotary angle of the rotors 20, 42 is synchronized with the longitudinal feed in such a manner that the window 36 of the sealing shoe 10 and the holder body 43 of the counter shoe 11 at all times engage the hose 15 between two products 16. The flash lamp 25 is fired at the moment when the axes 12, 13 and 28 lie in a common plane, that is, the flattened portions 38 and 46 press the hose 15 together. By means of a pulsed electrical field between the two electrodes 30, 31 in the discharge volume, a gas is converted into an electrically conducting plasma by impact ionization, and the plasma is heated up by the electric current. The light emission consists of a black body radiation with a color temperature of up to approximately 10,000 K which is superposed by the characteristic spectral lines of the ionized gas; this corresponds to a wide spectral emission of 160–2500 nm. The emission proceeds from the upper surface of the ignited, light-impervious plasma.

The energy radially emitted by the lamp 29 is reflected by the elliptical reflecting surface 27 on the second focal point of the ellipse. Such second focal point is situated approximately on the flattened portion 38 of the window 36 or, stated differently, at a location which is at a distance from the hose 15, corresponding to a single or dual thickness of the film 18 of the hose 15. In this manner more than one-half of the energy radiated by the lamp 29 is concentrated on the focal line at the surface in the middle or on the underside of the hose 15 so that on the focal line an energy density of more than 2 J/cm$^2$, up to 30 J/cm$^2$ is obtained, resulting in a very high degree of efficiency. Dependent on the thickness of the film of the hose 15, a pulse duration between 50 microseconds and 10 milliseconds is required. The desired spectrum of the emitted radiation depends from the type of the film 18 because the absorption coefficient of the material is dependent from the wave length. The radiation spectrum is relatively wide; it has, however, a maximum which depends from the current intensity. In case of 1,000 A/cm$^2$ the maximum is, for example, in the visible spectral range and shifts to the ultraviolet range upon an increase to 10,000 A/cm$^2$.

Assuming an advancing speed of 1 m/s in the direction A, a circulating radius of 8 cm of the surface 38 and a flash duration of 0.1 millisecond, there is obtained, for example, a rotary angle of only 3.5 arc minutes of the sealing device 10 during the duration of the flash. The sealing occurs thus extraordinarily rapidly and thereafter the surfaces 38, 45 are still pressed together for a sufficiently long period to result in a rapid cooling of the sealed seam. In this manner, very high output rates may be achieved. Large energy quantities may be introduced on purpose into the sealed seam. The pressing components of the shoes remain cold and cool the sealed seam immediately. Thick transparent material may be welded onto any desired absorbing material. The device is adapted also for a contactless sealing without a mechanical contact between the device and the films 18.

The embodiment according to FIG. 3 differs principally from that of FIGS. 1 and 2 in that the reflector 26 and the lamp 29 are stationary and the window 36 is mounted on a carrier 51 which rotates, as indicated by the arrow 14, about an axis 52 which is parallel to the axis 28 and which lies in a plane which contains the axes 28 and 13. The space 35 may be closed by a further window 53 shown in a dash-dotted line in FIG. 3. This arrangement makes possible to provide coolant circuit 39. This embodiment has above all the advantage that the flash lamp 29 is less exposed to shocks and that the terminals at the generator 32 and the coolant circuit 39 are of simpler construction.

In case the hose 15 is intermittently advanced, the counter shoe 11 and the window 36, instead of being rotated, may be moved linearly in suitable guides in the direction of the arrow 54 perpendicularly to the conveying direction A.

The device according to FIG. 4 differs from that of FIG. 3 in that the reflector 26 rotates whereas the flash lamp 29 remains stationary. The holder body 43 has a transparent window 61 and a reflecting, elliptical-cylindrical surface (counter reflector) 62 whose cross section complements the upper surface 27 of the reflector 26 in the focal point to an almost complete ellipse. The focal axis 28 of the reflector 26 is the rotary axis 12 of the reflector 26. The other focal point 63 lies in the middle of the two films 18 to be welded together. This embodiment is particularly adapted for sealing partially transparent films 18 because the light which is directly radiated from the lamp 29 to the window 36 is concentrated by the upper surface 62 on the focal line 63.

FIG. 5 shows a variant of the reflecting surface 27 of the reflector 26 which is structured in accordance with U.S. Pat. No. 4,641,315 and whose cross section is an involute. Such a cross-sectional configuration is useful mainly in the vicinity of the flash lamp 29 because of its radiation characteristics (opaque surface emitter).

The device according to the invention may also be driven in such a manner that a first flash produces a sealed seam and immediately thereafter a second, shorter but more intensive flash severs the hose 15 in the middle of the just-formed sealed seam.

The six figure pairs 6a,b through 11a,b show variants of the films 18 to be sealed. The left-hand illustration of each pair shows the films during application of optical energy, and the right-hand illustration of each pair shows the films provided with a sealed seam.

The films of FIGS. 6a, 6b are weakly absorbing. Particularly the apparatus according to FIG. 4 is adapted to provide them with a sealed seam.

Figures 7A, 7B:
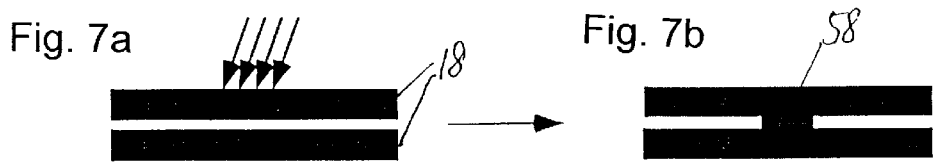

FIGS. 7a, 7b show the sealing of substantially absorbing films 18. In this case the heat admission to the sealed seam 58 is effected by heat conduction by and through the upper film 18.

Figures 8A, 8B:
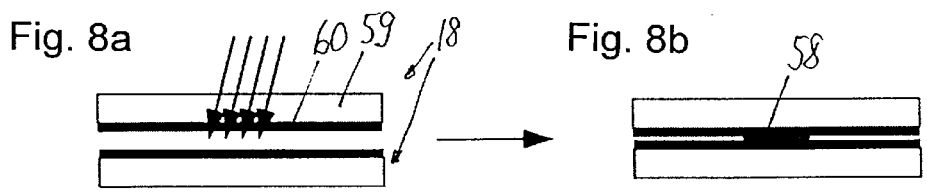

In the variant according to FIGS. 8a, 8b at least one of the films 18 is a compound film having an outer, transparent layer 59 and an inner, light-absorbing layer 60.

Figures 9A, 9B:
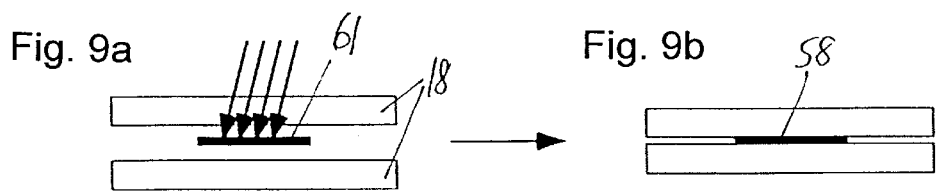

According to the variant shown in FIGS. 9a, 9b the films 18 are transparent and an additional, light-absorbing strip 61 is sealed in between.

Figures 10A, 10B:
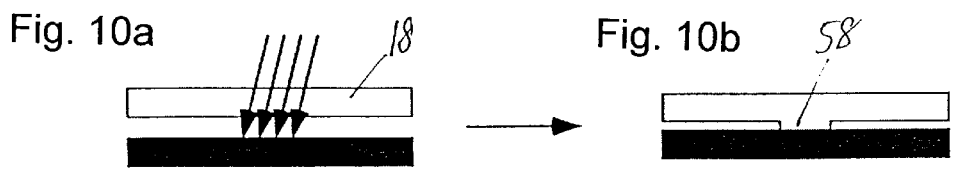

In the variant according to FIGS. 10a, 10b the film 18 facing the lamp 29 is transparent while the other film 18 is light absorbing.

In the variants according to FIGS. 8a, 8b; 9a, 9b; and 10a, 10b the energy is directly introduced at the location to be welded. In this manner, the sealing process is particularly rapid and efficient.

Figures 11A, 11B:
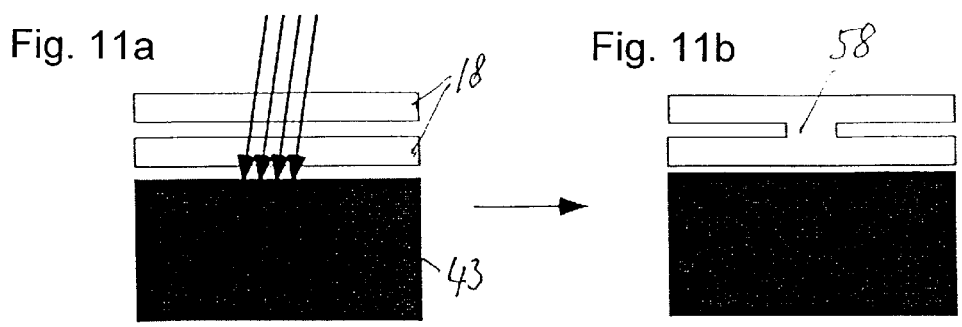

In the variant according to FIG. 11a, 11b both films 18 are transparent; the holder body 43 and/or its upper surface 45 is then light absorbing.

It will be understood that the above description of the present invention is susceptible to various modifications, changes and adaptations, and the same are intended to be comprehended within the meaning and range of equivalents of the appended claims.

What is claimed is:

1. An apparatus for sealing films together conveyed along a path, the films having a surface, a middle and an underside, the apparatus comprising (a) a counter shoe including a counter plate and a counter reflector;

(b) a sealing shoe defining, with said counter shoe, a clearance through which the films pass; said sealing shoe including
   (1) an elongated optical energy source having a length dimension oriented generally parallel to said path;
   (2) activating means for activating said energy source;
   (3) a-reflector for focussing light emitted by said energy source; said counter plate of said counter shoe being transparent to said light; said counter reflector of said counter shoe and said reflector of said sealing shoe forming a closed optical unit at a moment when said energy source is activated by said activating means; said optical unit having first and second focal points; at said moment said energy source being situated in said first focal point and the films passing through said second focal point; and
   (4) a window transparent to said light and having an outer surface adapted to be oriented toward said counter shoe for sealing the films by said light; the reflector and the energy source being arranged such that the light is focused on one of the surface, middle and underside of the films; and (c) means for urging said window and said counter shoe toward one another for pressing the films therebetween.

2. The apparatus as defined in claim 1, wherein said optical energy source includes a high-intensity pulsed light source.

3. The apparatus a s defined in claim 2, wherein said light source is a gas discharge lamp.

4. The apparatus as defined in claim 3, wherein said gas discharge lamp is a xenon flash lamp.

5. The apparatus as defined in claim 1, wherein said reflector has a surface forming, when viewed cross-sectionally, one part of an ellipse having said first and second focal points; further wherein said second focal point is situated in said outer surface of said window.

6. The apparatus as defined in claim 1, wherein said window is of a scratch resistant material.

7. The apparatus as defined in claim 6, wherein said material is sapphire glass.

8. The apparatus as defined in claim 1, further-comprising a space defined by said surface of said reflector and said window and a coolant circuit for circulating a transparent coolant through said space.

9. An apparatus for sealing films together conveyed along a path, the films having a surface, middle and underside, the apparatus comprising
   (a) a counter shoe;
   (b) a sealing shoe, defining, with said counter shoe, a clearance through which the films pass; said sealing. shoe including
      (1) an elongated optical energy source having a longitudinal axis and a length dimension oriented generally parallel to said path;
      (2) a reflector for focussing light emitted by said energy source;
      (3) a window transparent to said light and having an outer surface adapted to be oriented toward said counter shoe for sealing the films by said light; and
      (4) means for activating said energy source; wherein the reflector and the energy source are arranged such that the light is focussed on one of the surface, middle and underside of the films;
   (b) means for urging said window and said counter shoe toward one another for pressing the films therebetween;
   (c) means for rotating said reflector and said window as a unit about the longitudinal axis of said energy source; and
   (d) means for rotating said counter shoe in synchronism and opposite to said energy source about a further axis spaced from and extending parallel to said longitudinal axis of said energy source.

10. The apparatus as defined in claim 9, wherein said energy source is stationarily supported.

11. An apparatus for sealing films together conveyed along a path, the films having a surface, middle and underside, the apparatus comprising a sealing-shoe and a counter shoe defining a clearance through which the films pass; said sealing shoe including
   (1) an elongated optical energy source having a longitudinal axis and a length dimension oriented generally parallel to said path;
   (2) a reflector for focussing light emitted by said energy source; said energy source and said reflector being stationarily supported relative to one another;
   (3) a window transparent to said light and having an outer surface adapted to be oriented toward said counter shoe for sealing the films by said light;
   (4) means for activating said energy source; said reflector and the energy source being arranged such that the light is focussed on one of the surface, middle and underside of the films; and
   (5) a carrier mounted for rotation relatively with respect to said energy source and said reflector, about an axis spaced from and parallel to said longitudinal axis of said energy source; said window being mounted on and moving with said carrier; and
further comprising means for urging said window and said counter shoe toward one another for pressing the films therebetween.

* * * * *